United States Patent [19]

Matsumoto

[11] Patent Number: 4,870,535
[45] Date of Patent: Sep. 26, 1989

[54] ANTISTATIC HOSE

[75] Inventor: Seiichi Matsumoto, Komae, Japan

[73] Assignee: Tokyo Sen-I Kogyo Co., Ltd., Tokyo, Japan

[21] Appl. No.: 202,242

[22] Filed: Jun. 6, 1988

[30] Foreign Application Priority Data

Nov. 16, 1987 [JP] Japan .................................. 62-174807

[51] Int. Cl.⁴ ............................................... H05F 3/02
[52] U.S. Cl. ........................................ 361/215; 174/47
[58] Field of Search ..................... 361/212, 215, 220; 174/47

[56] References Cited

U.S. PATENT DOCUMENTS

| | | | |
|---|---|---|---|
| 2,477,267 | 7/1949 | Robinson | 361/220 X |
| 3,678,675 | 7/1972 | Klein | 361/220 X |
| 4,108,701 | 8/1978 | Stanley | 361/215 X |

FOREIGN PATENT DOCUMENTS 1287573  8/1972  United Kingdom ................ 361/215

Primary Examiner—L. T. Hix
Assistant Examiner—Brian W. Brown
Attorney, Agent, or Firm—Staas & Halsey

[57] ABSTRACT

An antistatic hose is provided, including an inner layer of insulation material having a cylindrical configuration; a first electrically conductive fiber spirally arranged within the inner layer; a second electrically conductive fiber longitudinally arranged within the inner layer and electrically connected to the first electrically conductive fiber at the crossing points therewith; a linear reinforcing member spirally wound around the external surface of the inner layer and adhered thereto; and a member for covering both the inner layer and the reinforcing member and adhered thereto. The antistatic hose is able to prevent a material conducted by the hose from being charged by static electricity and also to discharge the static electricity from the material. In addition, an anti-collapse characteristic is achieved by the spirally wound reinforcing member and the cover member strongly adhered to both the inner layer and the reinforcing member to prevent separation therebetween.

15 Claims, 2 Drawing Sheets

ANTISTATIC HOSE

BACKGROUND OF THE INVENTION

The present invention relates to an antistatic hose for conducting gas, liquid, powder and the like, and more particularly to an antistatic hose suitable for conducting gas, liquid and powder charged by static electricity.

Heretofore, there has been a hose for conducting electro static charged gas, liquid, powder and the like, for example, as disclosed in Japanese Utility Model Patent Publication No. 30302/1984. This antistatic hose comprises a cylindrical flexible inner layer of insulation material which is wound by electrically conductive fibers, and an outer layer of flexible insulation material coated on the external peripheral surface of the conductive fibers from which a portion of the conductive fibers is exposed.

The antistatic hose of this prior art is intended for conducting a fluid having a pressure higher than an atmospheric pressure and is suitable, for example, for conducting synthetic resin or pellets supplied to an injection molding machine.

Accordingly, the hose of this prior art lacks sufficient strength against the force or pressure acting from the outside to the inside of the hose. When this hose is used in conjunction with a vacuum pump for evacuating a combustible gas, the hose is often collapsed by atmospheric pressure and therefore sometimes has caused an accident wherein the gas is exploded by the static electricity charge on the hose.

SUMMARY OF THE INVENTION

It is an object of the present invention to provide an antistatic hose which can prevent an electrostatic charge although static electricity is generated on the inner surface of the hose and also has a sufficient strength for preventing the hose from being collapsed although high vacuum pressure is generated within the hose.

According to the present invention, there is provided an antistatic hose comprising an inner layer of insulation material having a cylindrical configuration, a first electrically conductive fiber spirally arranged within said inner layer, a second electrically conductive fiber longitudinally arranged within said inner layer and electrically connected to said first electrically conductive fiber at the crossing points therewith, a linear reinforcing member spirally wound around the external surface of the inner layer and adhered thereto, and a cover member for covering both said inner layer and said reinforcing member and adhered thereto.

BRIEF DESCRIPTION OF THE DRAWINGS

Other objects and advantages of the present invention will become apparent from the following detailed description of preferred embodiments of the present invention taken in reference to the accompanying drawings in which.

DETAILED DESCRIPTION OF THE PREFERRED EMBODIMENTS

Figure 1:
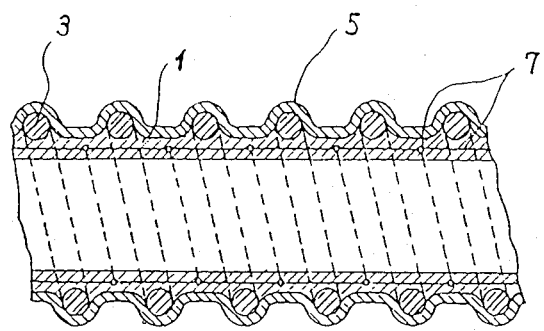
FIG. 1 is a longitudinal sectional view of one embodiment of an antistatic hose of the present invention.
Figure 2:
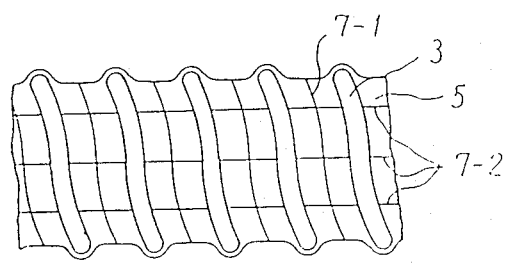
FIG. 2 is a side elevational view of the antistatic hose of FIG.

FIG. 1 is a longitudinal sectional view of one embodiment of an antistatic hose of the present invention and FIG. 2 is a side elevational view of the antistatic hose of FIG. 1. In these drawings numeral 1 denotes an inner layer of the hose, the detailed structure thereof will be hereinafter described. Numeral 3 denotes a linear reinforcing member which is made of synthetic resin spirally wound around the external surface of the inner layer 1 and is adhered thereto. Numeral 5 denotes a cover member of flexible synthetic resin such as vinyl which covers the inner layer 1 and the reinforcing member 3 and is adhered to both the inner layer 1 and the reinforcing member 3 by appropriate adhesive.

Figure 3:
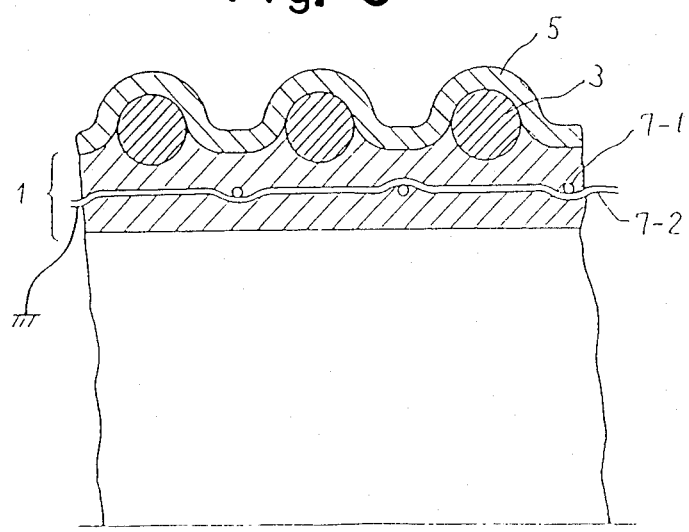
FIG. 3 is an enlarged view of one part of the hose of FIG. 1.

The inner layer 1 is made of flexible synthetic resin such as vinyl and is provided with an electrically conductive layer 7 of electrically conductive fiber embedded within the inner layer 1 as best shown in FIG. 3. The electrically conductive layer or fiber 7 is made, for example, of a blended yarn of 20% stainless fibers each having a diameter of 20 $\mu$m and 80% synthetic resin fibers such as polyamide.

Figures 4A, 4B:
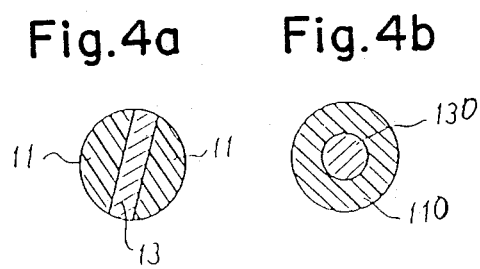
FIG. 4 (a) and FIG. 4 (b) are cross-sectional views, each showing other embodiments of an electrically conductive fiber used for forming the antistatic hose of the present invention; and, FIG. 5 is a partially enlarged longitudinal sectional view of another embodiment of the antistatic hose of the present invention.

It is also possible to use a fiber shown in FIG. 4 (a) and FIG. 4 (b) as the electrically conductive fiber.

The fiber shown in FIG. 4 (a) comprises an electrically conductive fibrous member 13 and side members 11 arranged at opposite sides of the member 13. The conductive fibrous member 13 forms a foillike electrically conductive layer which is formed by a mingled material comprising fine particles of electrically conductive carbon black or of electrically conductive metal compound and synthetic resin material. The side members 11 sandwiching the conductive fibrous member 13 are formed by synthetic fiber material, for example, of polyamide fiber. Accordingly, the electrically conducting fiber of FIG. 4 (a) is formed as a triplex structure wherein the conductive fibrous member 13 is exposed to the external circumferential surface of the fiber at diametrically opposed portions thereof continuously along a longitudinal direction thereof. It is also possible to form a blended yarn, for example, of 10% fibers of FIG. 4 (a) and 90% synthetic resin fibers such as polyamide and to use the blended yarn for forming the electrically conductive layer 7.

The fiber shown in FIG. 4 (b) comprises a centrally arranged conductive fibrous member 130 which is coated by a fibrous member 110 for example of polyamide. The conductive fibrous member 130 is formed by a mingled material comprising fine particles of electrically conductive carbon black or of conductive metallic compound and synthetic resin material and has a predetermined conductivity. Similar to the fiber of FIG. 4 (a), it is also possible to form a blended yarn, for example, of 10% fibers of FIG. 4 (b) and 90% synthetic resin fibers such as polyamide and to use the blended yarn for forming the electrically conductive layer 7.

As shown in FIGS. 2 and 3, the electrically conductive layer i.e. fibers 7 comprise a first electrically conductive fiber 7-1 embedded within the inner layer 1 and spirally wound similar to the reinforcing member 3 and a second electrically conductive fiber 7-2 longitudinally arranged within the inner layer 1. These first and second fibers 7-1 and 7-2 contact each other at their crossing points so as to form an electrical communication therebetween.

In using the antistatic hose thus formed, the first and/or second fibers (or fiber) are electrically grounded by an appropriate way. For example, when powdery synthetic resin is passed through the hose, it contacts the inner surface of the hose and usually generates static electricity. The generated static electricity is collected by the first and/or second fibers (or fiber) and discharged to the ground. Since the first and second electrically conductive fibers have a high electric resistance, the energy of the static electricity is dispersed by the high resistance of these fibers and therefore generation of spark within the hose is completely prevented. Of course, no spark is generated due to the same reason when material charged by static electricity is passed through the hose and contacts the inner surface thereof.

Since the first electrically conductive fiber 7-1 is spirally wound within the hose, its inductance is increased although it can collect much static electricity generated on the inner surface of the hose. The increased inductance of the spirally wound first fiber 7-1 usually precludes a rapid discharge of the static electricity to the ground. However, since a short circuit of the first fiber 7-1 is formed by the second fiber 7-2 according to the present invention, the inductance of the first fiber 7-1 is reduced. Thus makes it possible to rapidly discharge the static electricity to the ground.

In addition, according to the present invention, the provision of the reinforcing member 3 spirally wound around the inner layer 1 of the hose prevents the hose from being collapsed even if the pressure within the hose is greately reduced relative to the atmospheric pressure. Furthermore, since the cover member 5 covering both the inner layer 1 and the reinforcing member 3 is strongly adhered thereto, separation of the inner layer 1 from the reinforcing member 3 is never caused even if the pressure difference between the inside and the outside of the hose is greately increased.

Figure 5:
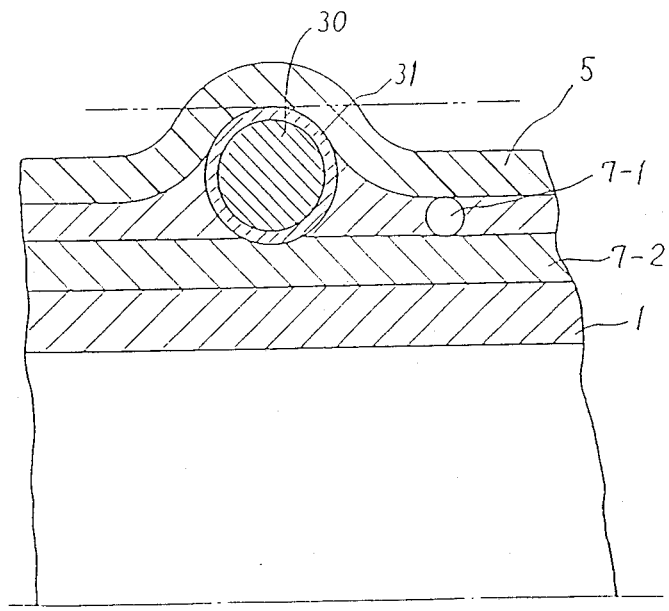

FIG. 5 shows another embodiment of the present hose. The same reference numerals are also utilized in FIG. 5 to describe the same elements previously described with reference to the first embodiment and therefore descriptions relating to these elements will be omitted. A numeral 30 denotes a metallized reinforcing member of polyamide on which an electrically conductive layer 31, for example, of alminium is vapor deposited. The metallized reinforcing member 30 is substantially contacted with the second electrically conductive fiber 7-2.

When the hose of the present invention is used with its length extended over a very long distance, sufficient discharge of the static electricity cannot be achieved if the hose is connected to the ground only at opposite ends thereof. In such a case, exposing the vapor deposited layer 31 from the cover member 5 at an appropriate position (or positions) along the hose by cutting out a part of the cover member 5 along a dotted line as shown in FIG. 5 and then winding a metal band around the exposed layer 31 to connect the metal band to the ground.

According to the present invention, it is possible to prevent a material conducted by the hose from being charged by the static electricity and also possible to discharge the static electricity from the material. In addition, a superior anti-collapse characteristic is achieved according to the present invention by the spirally wound reinforcing member and the cover member strongly adhered to both the inner layer and the reinforcing member to prevent separation therebetween.

While particular embodiments of the present invention have been shown and described, it should be understood that the present invention is not limited thereto since many modifications may be made. It is therfore contemplated to include in the present invention any and all such modifications as fall within the spirit and scope of the underlying claims.

What is claimed is:

1. An antistatic hose, comprising:
    an inner layer of insulation material having a cylindrical configuration;
    a first electrically conductive fiber spirally arranged within said inner layer;
    a second electrically conductive fiber longitudinally arranged within said inner layer and electrically connected to said first electrically conductive fiber at the crossing points therewith;
    a linear member spirally wound around the external surface of the inner layer and adhered thereto to reinforce the inner layer; and,
    a cover member for covering both said inner layer and said reinforcing member and adhered thereto.

2. An antistatic hose according to claim 1 wherein said inner layer is formed by flexible synthetic resin.

3. An antistatic hose according to claim 1 wherein said first and second electrically conductive fibers are formed by a blended yarn of stainless steel fibers and synthetic resin fibers.

4. An antistatic hose according to claim 3, wherein said blended yarn is formed by about 20% stainless steel fibers, each having a diameter of about 20 $\mu$m, and about 80% synthetic resin fibers.

5. An antistatic hose, comprising:
    an inner layer of insulation material having a cylindrical configuration;
    a first electrically conductive fiber spirally arranged within said inner layer;
    a second electrically conductive fiber longitudinally arranged within said inner layer and electrically connected to said first electrically conductive fiber at the crossing points therewith;
    wherein said first and second electrically conductive fibers include a foillike electrically conductive fibrous member formed by mingled material including fine particles of electrically conductive material and synthetic resin material, and synthetic resin fibrous members combined to said foillike electrically conductive fibrous member at opposite sides thereof,
    a linear reinforcing member spirally wound around the external surface of the inner layer and adhered thereto; and
    a cover member for covering both said inner layer and said reinforcing member and adhered thereto.

6. An antistatic hose, comprising:
    an inner layer of insulation material having a cylindrical configuration;
    a first electrically conductive fiber spirally arranged within said inner layer;
    a second electrically conductive fiber longitudinally arranged within said inner layer and electrically connected to said first electrically conductive fiber at the crossing points therewith, wherein said first and second electrically conductive fibrers are formed by a centrally arranged electrically conductive fibrous member of mingled material including fine particles of electrically conductive material and synthetic resin material, and a synthetic resin fibrous member arranged around said centrally arranged electrically conductive fibrous member to coat this fibrous member;

a linear reinforcing member spirally wound around the external surface of the inner layer and adhered thereto; and a cover member for covering both said inner layer and said reinforcing member and adhered thereto.

7. An antistatic hose according to claim 5 wherein said electrically conductive fibrous member is formed by mingled material including fine particles of electrically conductive carbon black and synthetic resin material.

8. An antistatic hose according to claim 5 wherein said electrically conductive fibrous member is formed by mingled material including fine particles of metallic compound and synthetic resin material.

9. An antistatic hose, comprising:

an inner layer of insulation material having a cylindrical configuration;

a first electrically conductive fiber spirally arranged within said inner layer;

a second electrically conductive fiber longitudinally arranged within said inner layer and electrically connected to said first electrically conductive fiber at the crossing points therewith;

a linear reinforcing member spirally wound around the external surface of the inner layer and adhered thereto;

wherein said reinforcing member is formed by a synthetic resin member on which electrically conductive foillike film is deposited, and said electrically conductive foillike film is electrically connected to at least one of said first and second electrically conductive fibers; and a cover member for covering both said inner layer and said reinforcing member and adhered thereto.

10. An antistatic hose according to claim 9 wherein said electrically conductive foillike film is formed by vapor depositing a metal such as alminium.

11. An antistatic hose according to claim 9 wherein one portion of said electrically conductive foillike film of said reinforcing member is exposed from said cover member.

12. An antistatic hose according to claim 1 wherein said cover member is formed by flexible synthetic resin.

13. An antistatic hose according to claim 6 wherein said electrically conductive fibrous member is formed by mingled material including fine particles of electrically conductive carbon black and synthetic resin material.

14. An antistatic hose according to claim 6 wherein said electrically conductive fibrous member is formed by mingled material including fine particles of metallic compound and synthetic resin material.

15. An antistatic hose according to claim 10 wherein one portion of said electrically conductive foil-like film of said reinforcing member is exposed from said cover member.

* * * * *